United States Patent [19]
Ersoy et al.

[11] Patent Number: 5,934,145
[45] Date of Patent: Aug. 10, 1999

[54] SELECTION DEVICE FOR AN AUTOMATIC TRANSMISSION OF A MOTOR VEHICLE

[75] Inventors: Metin Ersoy, Walluf; Detlev Tiemeyer, Lengerich; Wolfgang Kalz, Osnabrück, all of Germany

[73] Assignee: Lemförder Metallwaren AG, Stemwede-Dielingen, Germany

[21] Appl. No.: 08/928,374

[22] Filed: Sep. 12, 1997

[30] Foreign Application Priority Data

Sep. 13, 1996 [DE] Germany ............... 196 37 254

[51] Int. Cl.⁶ ................................... F16H 59/10
[52] U.S. Cl. ................. 74/473.18; 74/471 XY; 74/473.12; 74/473.28
[58] Field of Search .......... 74/471 XY, 473.22, 74/473.21, 473.33, 473.12, 473.18, 575, 473.28; 267/150

[56] References Cited

U.S. PATENT DOCUMENTS

| | | | |
|---|---|---|---|
| 3,941,008 | 3/1976 | Cambria | 74/473.28 |
| 3,978,738 | 9/1976 | Naulin | 74/471 X |
| 4,912,997 | 4/1990 | Malcolm et al. | 74/473.12 |
| 5,150,633 | 9/1992 | Hillgartner | 74/473.18 |
| 5,277,078 | 1/1994 | Osborn et al. | 74/473.28 |
| 5,435,424 | 7/1995 | Murakami et al. | 74/473.28 |
| 5,445,046 | 8/1995 | Kataumi et al. | 74/473.28 |
| 5,689,996 | 11/1997 | Ersoy | 74/335 |

FOREIGN PATENT DOCUMENTS

| | | |
|---|---|---|
| 0 568 928 A1 | 11/1993 | European Pat. Off. . |
| 0 620 385 A1 | 10/1994 | European Pat. Off. . |
| 40 29 330 C2 | 3/1992 | Germany . |
| 196 08 981 | 9/1997 | Germany . |

*Primary Examiner*—John A. Jeffery
*Assistant Examiner*—William C Joyce
*Attorney, Agent, or Firm*—McGlew and Tuttle, P.C.

[57] ABSTRACT

A selection device for an automatic transmission of motor vehicles, with a selection lever, and a crosspiece. The device has a spring-loaded positioned ratchet, which is mounted on the crosspiece so that it can turn around an axle, whereby a catch for the reverse drive step of the selection device is provided.

8 Claims, 5 Drawing Sheets

5,934,145

SELECTION DEVICE FOR AN AUTOMATIC TRANSMISSION OF A MOTOR VEHICLE

FIELD OF THE INVENTION

The invention concerns a selection device for an automatic transmission of a motor vehicle with a housing and a selection lever mounted so that it can turn in a crosspiece in the housing.

BACKGROUND OF THE INVENTION

In selection devices, which are connected with the motor-vehicle transmission by means of rods, cables or other mechanical transmission components, the actuation forces to be applied to the gear selection are given in advance by the construction. When selecting a travel step, the driver must overcome a resistance, which is transmitted to him based on a switching perception. The setting of a transmission gear can thus be detected by the driver. In contrast to this, in electronically controlled selection devices for motor vehicle transmissions, which are mechanically decoupled from the motor-transmission unit, the forces to be used for switching are often simulated in order to transmit to the driver a sensation of switching.

An electronic selection device for the transmission of motor vehicles is already known from DE 196 08 981, in which the motor vehicle transmission can be switched by tipwise actuation of the selection lever in one or the other direction. The movement of the selection lever is detected by sensors and further processed in a control unit.

A crosspiece serves for the purpose, on the one hand, of supporting the selection lever in the switching housing and, on the other hand, for the purpose of making possible the simulation of a switching force. The selection lever can be turned in two orthogonal directions, whereby only one of the two axes is taken up in the housing. The selection lever can be turned around this axis from a first into a second switch channel. Under the place of support of the selection lever, the crosspiece is transformed into a curved region, which is provided with a profiled surface. This profiled surface is designed in an increasing manner in any switching direction in order to simulate a continuously increasing switching force.

Spring-loaded catching means on the selection lever cooperate with this profiled surface.

For the selection of the reverse gear, the selection lever with the catch means must be guided over a cam-shaped region. The reverse gear is released only after this is surmounted.

SUMMARY AND OBJECTS OF THE INVENTION

The primary object of the invention is to create a selection device for an automatic drive of a motor vehicle, which opposes a definable force and returns the selection lever automatically to its initial position without mechanical transmission components, with a simple construction and for the selection of automatic drive steps of the selection motion, whereby after selection of the reverse gear, the selection lever will be established in this position.

A selection device according to the invention for an automatic transmission of a motor vehicle has a selection lever, on which a selection knob is found on its upper end turned toward the driver. The selection lever is mounted in a housing of the selection device by means of a crosspiece that receives it. The selection lever is mounted so that it can turn in the crosspiece in the housing.

The selection lever is also mounted in the crosspiece so that it can turn around a first axis. The crosspiece is in turn arranged in the housing in bearing bushes so that it can turn around a second axis. The first and second axes are approximately orthogonal, but preferably are spatially displaced relative to one another. The crosspiece is transformed into a curved region underneath the bearing place in the housing.

In its lower region turned away from the driver, the selection lever has a spring loaded, axially moveable slider with catch means. Spring-loaded rolls, rollers, spheres, or the like are conceivable as the catching means. The catching means come into contact with at least one slide surface in the curved region of the crosspiece. A spring-positioned ratchet (catch), that can turn around an axis, is also mounted in this curved region of the crosspiece. This ratchet can be made up of one part or several parts. It serves for catching the selection lever in the drive step corresponding to reverse gear.

In addition, the crosspiece also has at least one catch means, which makes possible the positioning of the lever in the respective selection channel.

In a selection device according to the invention, many additional functions that can be realized in a mechanical switching device often only with considerable expenditure can be integrated in a simple way. For example, it is possible to detect the position of the selection lever in a simple way and to transmit this to an electronic control component.

The various features of the novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
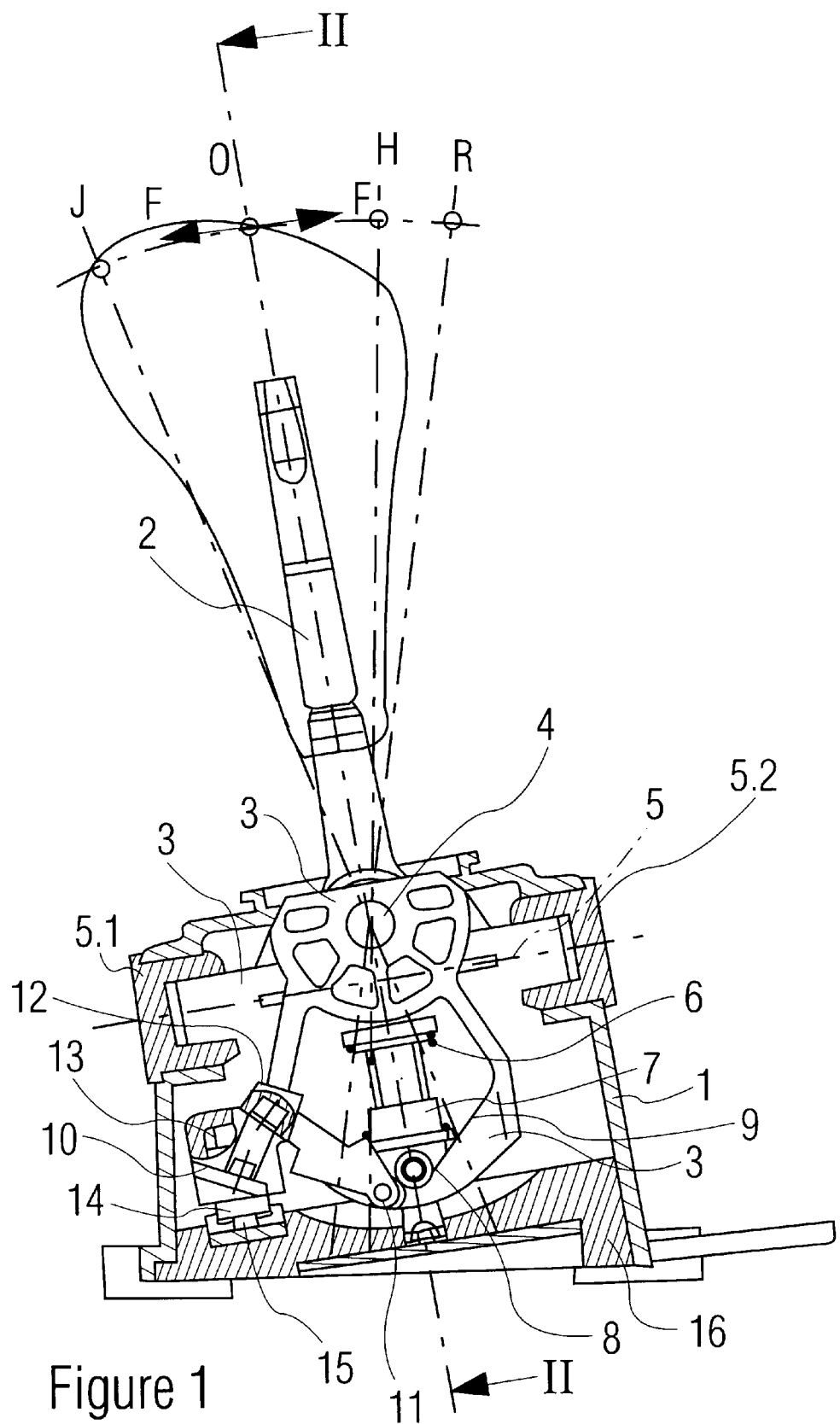
FIG. 1 is a sectional representation of a selection device according to the invention.

A selection device according to the invention for an automatic transmission of a motor vehicle is represented in FIG. 1. A selection lever 2 with a crosspiece 3 on a crosspiece turning axis 5 is mounted in a housing 1 that is stationary on the automobile body. Crosspiece turning axis 5 is in turn taken up in mounting or bearing bushes 5.1 and 5.2 in housing 1.

Selection lever 2 penetrates crosspiece 3 in the axial direction and is mounted in crosspiece 3 on a pin 4. Pin 4 is arranged orthogonal and spatially displaced relative to crosspiece turning axis 5.

In its lower region turned away from the driver, selection lever 2 has a slider 7 supported by a pressure spring 6 with catching rolls 8 attached thereon. Catching rolls 8 stand in contact with a slide face 9 in a curved region of crosspiece 3. The slider 7, pressure spring 6, catching rolls 8 and slide face 9 form a return means.

A ratchet or catch 12 that can turn around an axis of axle 11 and is supported by pressure springs 10 on crosspiece 3 is also present on the curved region of crosspiece 3. This ratchet 12 is formed of two legs in the example of embodiment and takes up a part of the curved region of crosspiece 3 between these legs. Pressure springs 10 of ratchet 12 are designed in a very soft or plastic manner according to the invention, and thus have a small spring stiffness.

Ratchet 12 is comprised of a linearly increasing region, which forms a cam-type region, so that catching rolls 8 must overcome an "upper dead point" for the selection of reverse gear, before the ratchet engages and catches and thus establishes the position of selection lever 2. Since spring 10 has a small spring stiffness, for positioning of the selection lever, the geometry of ratchet 12, particularly of the cam-type region, must be designed such that selection lever 2 is held rigidly in the reverse gear position.

Further, a roll holder 14 is supported by a pressure spring 13 provided on crosspiece 3. Pressure spring 13 supports roll 15. Roll 15 cooperates with a profiled surface of a shifting gate 16. Shifting gate 16 is designed as the underpart of the housing and forms a catch mechanism. It is assured in this way that selection lever 2 can be positioned in a first defined channel G1 during selection of the "forward gear" and can be positioned in a second defined channel G2 for the selection of the "reverse gear", as is also shown by FIG. 2.

Shifting gate 16 has a double function in a selection device according to the invention. On the one hand, it is provided with the profiled surfaces described previously in order to make possible a catching of selection lever 2, and on the other hand, the lower end of selection lever 2 is guided into shifting gate 16. It is achieved by an appropriate configuration of shifting gate 16 that the reverse gear can be selected only in channel G2 assigned to it.

Figure 2:
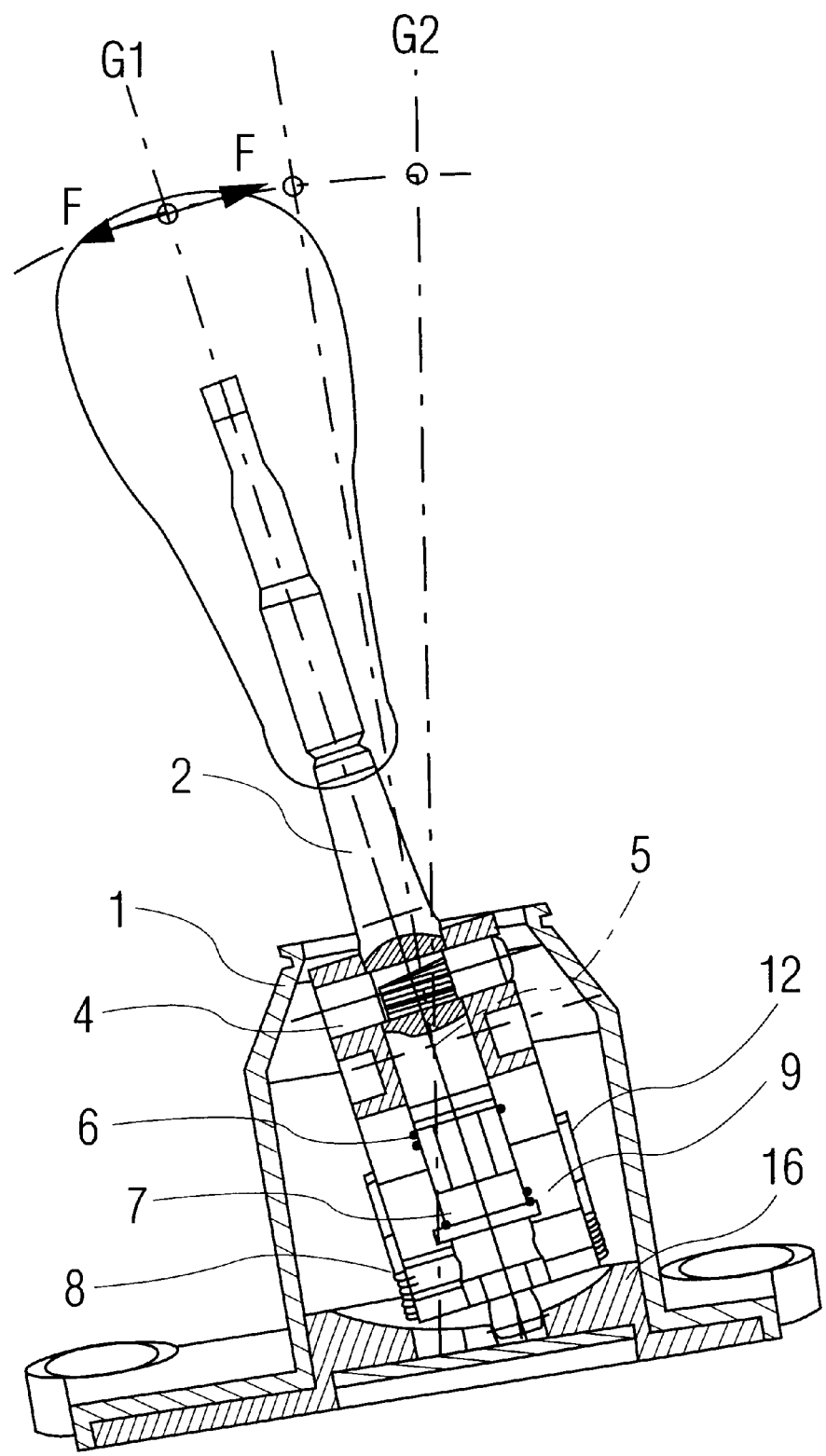
FIG. 2 is a sectional representation of a selection device of the invention along line H—H of FIG. 1.
Figure 3:
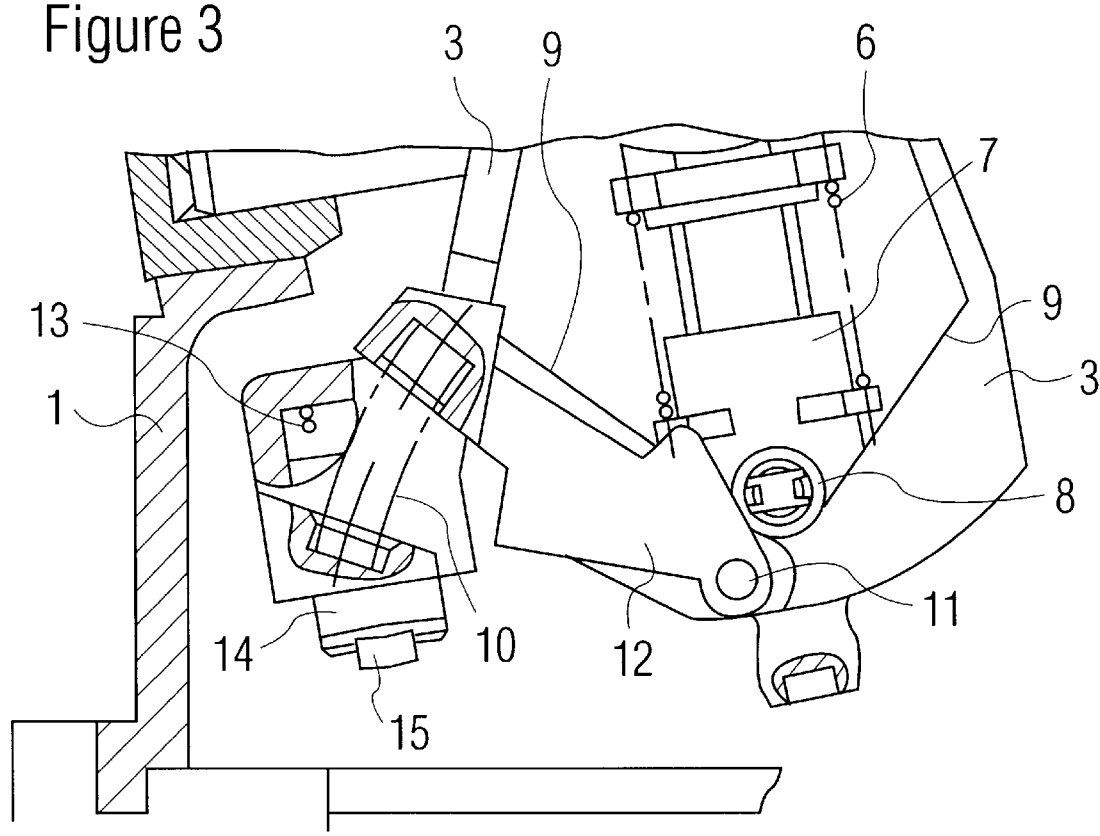
FIG. 3 is an enlarged sectional representation of a portion of the selection device of the invention, with the selection gate removed.
Figure 4:
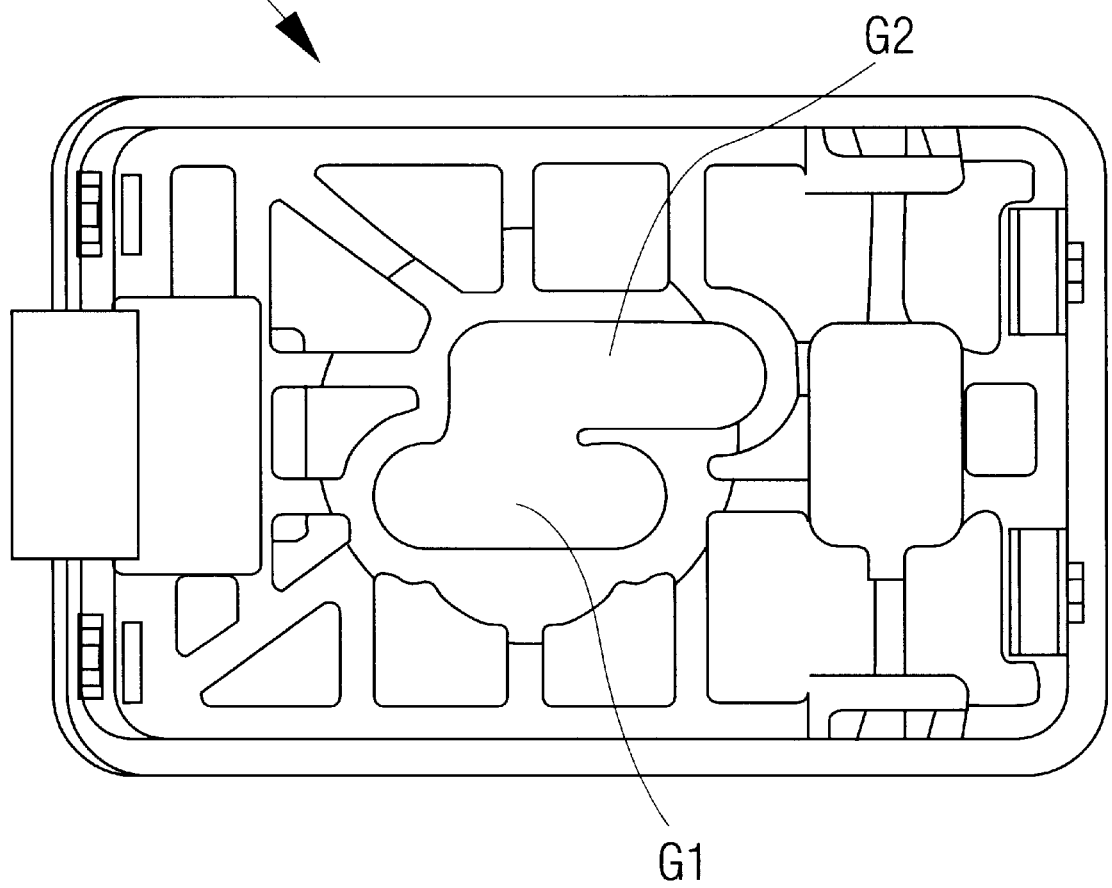
FIG. 4 is a top view of the selection gate of the invention.
Figure 5:
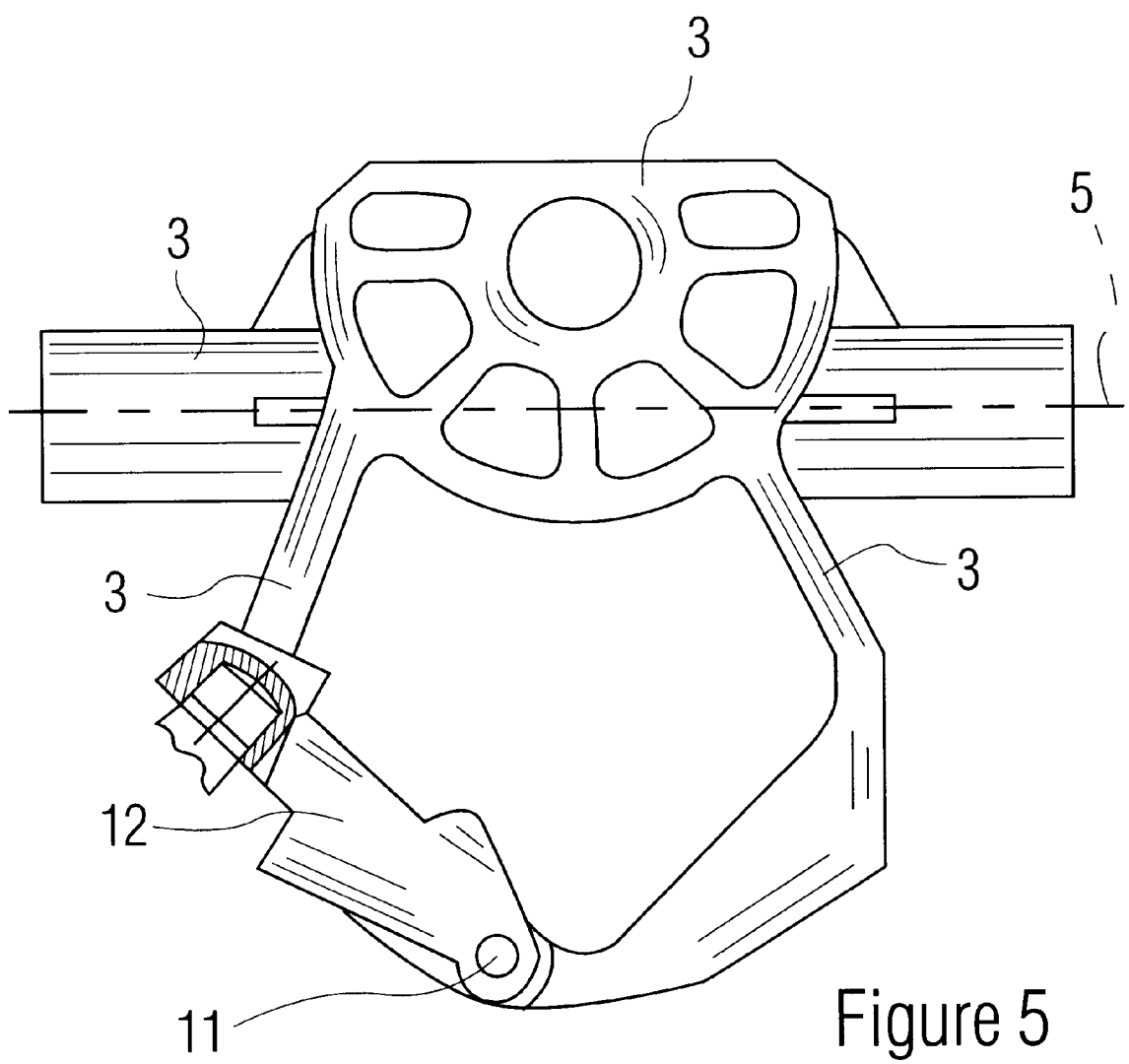
FIG. 5 is a view of the crosspiece and the ratchet.

It can also be seen from the representation in FIG. 2 that slider 7 is supported in a spring-loaded manner against selection lever 2 and two catch rolls 8 are attached laterally to slider 7. These catch rolls 8 roll out from their neutral position on slide face 9 of the curved region of crosspiece 3 when selection lever 2 is moved. In the form of embodiment in the drawing, only movement of selection lever 2 approximately in the vehicle lengthwise direction is possible as the selection direction.

Selection lever 2 is mounted on pin 4 in crosspiece 3. Thus the central axis of pin 4 lies above crosspiece turning axis 5.

For better understanding, the mode of operation of a selection device of the invention, shown in the drawing, will be explained in the following.

In the basic position, selection lever 2 is found in channel G1 in the position designated 0. For selection of drive steps, selection lever 2 is turned tipwise around pin 4 in crosspiece 3.

Catching rolls 8 slide or roll on slide face 9, which causes selection lever 2 to return again to its initial position 0 after tipping, due to the increasing configuration of the face. Selection lever 2 is guided by its lower end in shifting gate 16. When selection lever 2 moves in channel G1 in the H direction (towards R), rolls 8 cannot depress ratchet 12 to such an extent that the rachet 12 becomes engaged. This is due to the configuration of shifting gate 16, which prevents such movement.

In order to be able to select reverse gear, the driver rotates selection lever 2 from position 0 together with crosspiece 3 around crosspiece turning axis 5 into the second channel G2. With this movement the spring-supported rolls 15 together with the defined profiled surface of shifting gate 16, which also forms the lower part of the housing, provide that selection lever 2 is locked in this channel G2.

The driver can now set the reverse gear by turning selection lever 2 around pin 4, and catching rolls 8 will slide on slide face 9 via ratchet 12 up to catching position R.

Ratchet 12 has a linearly increasing region, which changes into a cam-type region, so that catching rolls 8 must first overcome an "upper dead point" for selection of reverse gear before the ratchet is engaged and thus fixes selection lever 2.

In order to move selection lever 2 out from catching position R, according to the invention, a detectably larger force must be applied to selection lever 2, than is the case for a forward drive in the drive steps. Selection lever 2 is turned out from catching position R around pin 4 again to position 0, whereby it must first overcome the cam-type region of the ratchet. Catching rolls 8 press on ratchet 12, and the latter is turned around axle 11, whereby pressure springs 10 are loaded against their direction of action. Catching rolls 8 of slider 7 of selection lever 2 again return the latter to position 0, of course, in channel G2.

In order to be able to travel forward again, the driver must turn selection lever 2 with crosspiece 3 to channel G1. Roll 15 causes the selection lever to remain in this channel G1.

The presented electronically controlled automatic switching device according to the invention for a motor-vehicle transmission offers a high comfort, since no noise or vibrations of the transmission are transmitted via the selection lever, as, for example, is the case with rods or cables, but only the position of the selection lever is detected, for example, by sensors and is further conducted to the transmission. The "switching sensation" very familiar to the driver is thus simulated.

While a specific embodiment of the invention has been shown and described in detail to illustrate the application of the principles of the invention, it will be understood that the invention may be embodied otherwise without departing from such principles.

What is claimed is:

1. A selection device for an automatic transmission of motor vehicles, the device comprising:

a housing;

a crosspiece rotatably supported by said housing;

a selection lever rotatable mounted on said crosspiece and in said housing, said selection lever having a shift gate end;

a shift gate having a first and a second channel receiving said shift gate end for limiting movement of said selection lever along said channels;

return means on said selection lever and said crosspiece for biasing said selection lever into a starting position when said selection lever is anywhere in said first channel;

a rachet rotatably supported on said crosspiece for rotation with respect to said crosspiece and biasing said selection lever in an end position of said second channel when said selection lever is in said end position of said second channel.

2. The selection device for an automatic transmission of motor vehicles according to claim 1, wherein said ratchet is mounted rotatable on said crosspiece.

3. The selection device for an automatic transmission of motor vehicles according to claim 1, further comprising spring loading means for biasing said ratchet in a spring-loaded position.

4. A selection device for an automatic transmission of motor vehicles, the device comprising:

a housing;

a crosspiece supported by said housing, said crosspiece having a curved region with a slide face;

a selection lever rotatably mounted on said crosspiece and in the housing, said selection lever having a slider supported by a pressure spring, said slider including catching rolls, said catching rolls being in contact with said slide face, said selection lever having a shift gate end;

a ratchet supported by said crosspiece, said rachet having an axle engaging with said curved region, said ratchet being mounted on said crosspiece rotatable around said axle, said rachet defining a cam surface engagable with said catching rolls; and a shifting gate receiving said shift gate end of said selection lever, for limiting a path of movement of said selection lever.

5. The selection device for an automatic transmission of motor vehicles according to claim 4, further comprising spring loading means for supporting said ratchet positioned in a spring-loaded manner on said crosspiece.

6. A selection device for an automatic transmission of motor vehicles, the device comprising:

a housing;

a crosspiece supported by said housing, said crosspiece having a curved region with a slide face;

a selection lever rotatably mounted on said crosspiece and in the housing, said selection lever having a slider supported by a pressure spring, said slider including catching rolls, said catching rolls being in contact with said slide face, said selection lever having a shift gate end;

a ratchet supported by said crosspiece, said rachet defining a cam surface engagable with said catching rolls; and a shifting gate receiving said shift gate end of said selection lever, for limiting a path of movement of said selection lever.

7. The selection device for an automatic transmission of motor vehicles according to claim 6, further comprising an axle positioned on said curved region, said ratchet being mounted on said crosspiece rotatable around said axle.

8. The selection device for an automatic transmission of motor vehicles according to claim 7, further comprising spring loading means for supporting said ratchet positioned in a spring-loaded manner on said crosspiece.

* * * * *